United States Patent [19]

Reinhardt et al.

[11] 3,948,600
[45] Apr. 6, 1976

[54] SELECTED AMMONIUM SULFONATE CATALYSTS FOR AN IMPROVED PROCESS UTILIZING MILD CURING CONDITIONS IN DURABLE PRESS FINISHING OF CELLULOSE-CONTAINING FABRICS

[75] Inventors: Robert M. Reinhardt, New Orleans; Russell M. H. Kullman, Metairie, both of La.

[73] Assignee: The United States of America as represented by the Secretary of Agriculture, Washington, D.C.

[22] Filed: Feb. 27, 1975

[21] Appl. No.: 554,054

[52] U.S. Cl. .......................... 8/182; 8/183; 8/185; 8/186; 8/187
[51] Int. Cl.² ........................................ D06M 15/56
[58] Field of Search ........ 8/182, 185, 183, 187, 186

[56] References Cited
UNITED STATES PATENTS

| | | | |
|---|---|---|---|
| 2,315,128 | 3/1943 | Newkirk | 154/50 |
| 3,617,195 | 11/1971 | Moyse | 8/116.3 |
| 3,854,866 | 12/1974 | Franklin et al | 8/116 R |

*Primary Examiner*—John Kight, III
*Attorney, Agent, or Firm*—M. Howard Silverstein; Max D. Hensley

[57] ABSTRACT

In mild cure finishing, strong catalysts are required because of the modest curing conditions employed in the process. Suitable catalysts for mild cure finishing include strong inorganic acids, strong organic acids, active inorganic complexes, salt/acid combinations, and salts that are strong Lewis acids (i.e, certain metal salts). Ammonium salts of inorganic acids, although often used in other types of treatments for producing wrinkle resistant textiles, are not satisfactory catalysts for mild cure finishing. Unexpectedly and surprisingly, it has been discovered that ammonium salts of certain, but not all, sulfonic acids can serve as effective catalysts for mild cure finishing of cellulose-containing fabrics to produce wrinkle resistance and durable press properties. Among ammonium sulfonates which provide the catalysis needed for mild cure finishing are ammonium methanesulfonate, ammonium carboxymethanesulfonate ($NH_4O_3SCH_2COOH$), ammonium benzenesulfonate, and ammonium p-toluenesulfonate.

5 Claims, No Drawings

SELECTED AMMONIUM SULFONATE CATALYSTS FOR AN IMPROVED PROCESS UTILIZING MILD CURING CONDITIONS IN DURABLE PRESS FINISHING OF CELLULOSE-CONTAINING FABRICS

FIELD TO WHICH INVENTION RELATES

This invention relates to chemical finishing of cellulosic textiles. More particularly, it relates to catalysts for use in the mild cure finishing process for producing wrinkle resistance and durable press properties in cellulose-containing fabrics for apparel and home furnishing textile items. Specifically, it relates to certain ammonium sulfonates that can be used as catalysts in combination with relatively mild heating for the curing step in the treatment of cellulose-containing textile materials with methylolamide type crosslinking agents to produce wrinkle resistant, durable-press products.

DEFINITION: MILD CURE FINISHING

Mild cure finishing is a textile treatment process for producing wrinkle resistant goods in which cotton, cotton/synthetic fiber blend, or other cellulose-containing fabric, impregnated with a solution containing a suitable crosslinking agent and a strong catalyst, is heated at about 60°–105°C for a relatively short period of time without prior drying. During the heat treatment, moisture content of the cellulose fibers is reduced to about 2–5% and the strong catalyst promotes crosslinking of the cellulose chains with the fibers in a slightly swollen state. This type of treatment gives a finished fabric with properties somewhat different than those of fabrics treated under the fully anhydrous, high temperature reaction conditions of conventional pad-dry-cure processing. For example, mild cure processing gives a finished fabric with a high level of wet wrinkle resistance in conjunction with a high level of dry wrinkle resistance. The mild cure finishing process was first described at the 8th Cotton Utilization Research Conference, May 1–3, 1968, (see Proceedings, pages 87–92, published by U.S. Department of Agriculture as ARS 72–70 in May 1969).

THE PRIOR ART

As first disclosed, mild cure finishing required a strong mineral acid such as hydrochloric, nitric, or sulfuric acid, as catalyst. As the mild cure finishing process was further developed, other catalysts effective in the treatment were sought. It has been shown that some other compounds, combinations of compounds, and complexes can be used as alternatives in place of the strong mineral acids originally prescribed as catalysts. All of the materials that have proven to be suitable catalysts for mild cure finishing, however, have been strongly acidic—either strong Bronsted acids or very strong Lewis acids. Among the former are the aforementioned mineral acids and certain strong organic acids, and among the latter are strong Lewis acid salts such as stannic chloride, aluminum nitrate, and the like, and inorganic complexes such as zirconyl hydroxychloride, and the like. Lewis acid salts of intermediate strength such as zinc nitrate, zinc chloride, magnesium chloride, and the like, although widely used in conventional pad-dry-cure durable press treatments, do not provide sufficient catalytic activity for use in mild finishing.

Not surprisingly, many sulfonic acids can be utilized as catalysts for mild cure finishing. Methanesulfonic acid and hydroxymethanesulfonic acid have been disclosed for this purpose (Textile Research Journal, volume 43, pages 555–556 and volume 42, pages 89–96, respectively). However, ammonium sulfonates—which are neither Bronsted nor Lewis acids—would not be expected to provide the catalysis needed for the modest treatment conditions of mild cure finishing. Such predicted lack of sufficient activity would be further supported by the known and demonstrated (cf. Example 1, below) ineffectiveness of the ammonium salts of those mineral acids long recognized to be among the preferred catalysts of the mild cure finishing process. Mixtures of ammonium chloride with phosphoric or certain organic acids (U.S. Pat. No. 3,811,210) do result in suitable catalyst systems, however, these catalyst systems have been shown to operate through the generation of hydrochloric acid as the essential element of the catalytic activity (Textile Research Journal, volume 41, pages 821–826). It has been shown that neither component of these mixtures is suitable when used alone as catalyst in mild cure finishing.

OBJECTS OF THE PRESENT INVENTION

It is an object of the present invention to provide an effective catalyst for use in mild cure finishing that is not a Bronsted acid, is not a strong Lewis acid, and is not an active inorganic complex. It is a further object to provide such a material that can serve as catalyst in the mild cure finishing process as the process is known by those skilled in the art and hereinabove defined without any other substantial modifications of the process.

These objects are fulfilled by use of certain, but not all, ammonium sulfonates as catalysts in mild cure finishing.

SUMMARY OF THE INVENTION

An improvement in the mild cure finishing process is provided by replacement of the strong catalysts previously needed for this finishing method with certan ammonium sulfonates which, although not Bronsted or Lewis acids, are sufficiently active to serve as catalysts under the relatively moderate heating conditions of this process. It has been found that ammonium methanesulfonate (the ammonium salt of methanesulfonic acid, $CH_3SO_3NH_4$), ammonium carboxymethanesulfonate (the ammonium salt of sulfoacetic acid, $NH_4O_3SCH_2COOH$), ammonium benzenesulfonate (the ammonium salt of benzenesulfonic acid, $C_6H_5SO_3NH_4$), and ammonium p-toluenesulfonate (the ammonium salt of p-toluenesulfonic acid, $CH_3C_6H_4SO_3NH_4$) are suitable for use as catalysts in mild cure finishing. However, not all ammonium sulfonates can finish the driving force needed of a catalyst in mild cure finishing. For example, ammonium hydroxymethanesulfonate (the ammonium salt of hydroxymethanesulfonic acid, $HOCH_2SO_3NH_4$) and diammonium carboxymethanesulfonate (the diammonium salt of sulfoacetic acid, $NH_4O_3SCH_2COONH_4$) do not produce a finished fabric with a useful level of wrinkle resistance when they are used as catalysts under the treatment conditions of the mild cure finishing process.

Thus, without any other substantial modification of the treatment solution or adjustment of the treatment conditions of the known mild cure finishing process, ammonium methanesulfonate, ammonium carboxymethanesulfonate, ammonium benzenesulfonate, or ammonium p-toluenesulfonate is used as catalyst with a suitable N-methylolamide crosslinking agent. Cellulose-containing fabric is impregnated with the aqueous agent/catalyst solution and heat treated at a relatively mild temperature without predrying. The heat treatment reduces the moisture content of the fabric to 2-5% and, through the activity of the catalyst, brings about a crosslinking reaction between the agent and cellulose to produce wrinkle resistance properties in the finished fabric.

It was surprising to find that ammonium methanesulfonate, ammonium carboxymethanesulfonate, ammonium benzenesulfonate, and ammonium p-toluenesulfonate function as suitable catalysts for mild cure finishing, especially because ammonium salts of the common strong mineral acids and of organic carboxylic acids are not sufficiently active to serve as satisfactory catalysts in this finishing process. The finding was additionally surprising in view of the ineffectiveness of ammonium hydroxymethanesulfonate and of diammonium carboxymethanesulfonate as catalysts for mild cure finishing, despite their similarity to effective ammonium sulfonate catalysts.

SCOPE OF THE INVENTION

The preferred embodiments for practice of the present invention encompass a range of interrelated factors. The scope of the invention, thus, may be defined in the following description of the variables. It will be noted that except for the catalyst, other features of the process for mild cure finishing are essentially unchanged.

Textile materials which can be treated include cellulose-containing fabrics that are woven, knitted, or nonwoven. The cellulose may be natural, such as cotton, linen, ramie, and the like, or regenerated, such as viscose and other types of rayon. In addition to fabrics consisting wholly of cellulose, those in which cellulose is blended with synthetic fibers, such as polyesters, polyamides, polyacrylics, and the like, can be treated.

N-Methylolamide crosslinking agents of many types can be used as the finishing agent. These include N-hydroxymethyl (N-methylol) and N-alkoxymethyl (etherified N-methylol) derivatives of urea, cyclic ureas, uron, carbamates, and triazines. More specifically, applicable agents include urea derivatives such as methylated urea-formaldehyde and the like, cyclic urea derivatives such as dimethylol ethyleneurea, dimethylol dihydroxyethyleneurea, dimethylol propyleneurea, dimethylol 4-methoxy-5,5-dimethylpropyleneurea and the like, uron derivatives such as bis(methoxymethyl) uron and the like, carbamate derivatives such as dimethylol methyl carbamate, dimethylol ethyl carbamate, dimethylol hydroxyethyl carbamate, dimethylol methoxyethyl carbamate, dimethylol isopropyl carbamate and the like, and triazine derivatives such as tris(-methoxymethyl) melamine, partially methylated hexakis (hydroxymethyl) melamine and the like. Combinations of such agents also can be used. The amount of finishing agent used is about 6–18%, by weight, based upon the treatment bath.

Ammonium sulfonate salt that can be used as catalysts in mild cure finishing include ammonium methanesulfonate ($CH_3SO_3NH_4$), ammonium carboxymethanesulfonate ($HOOCCH_2SO_3NH_4$), ammonium benzenesulfonate ($C_6H_5SO_3NH_4$), and ammonium p-toluenesulfonate ($CH_3C_6H_4SO_3NH_4$). They are employed in amounts such that 100 g. of aqueous treatment bath contains one of the above-mentioned ammonium sulfonates in a ratio of about 0.67 to 1.0 millimole to each percent (by weight) of finishing agent.

The treatment bath can contain suitable additives, softeners, and the like as described by the finisher as long as these materials are compatible with the agent and catalyst which are, of course, the critical ingredients of the finishing process. For example, a nonionic emulsion of polyethylene can be added to the treatment bath to serve as fabric softener.

Application of the treatment solution to the fabric may be accomplished by any convenient means. Among the methods of application are soaking, spraying, sponging and the like. However, the most common method used by the textile wet processing industry for uniform application of treatment solutions to fabric is that of immersing the fabric into the finishing bath and then passing the wet fabric through pad rolls to remove excess treatment solution. The padding operation adjusts the pickup of solution and gives an even penetration and distribution of the treatment solution throughout the fibers of the textile material. The pickup of treatment solution in the wet, impregnated fabric should be adjusted within the range of from about 50% to about 120% based upon the dry weight of the untreated fabric.

The curing operation of the mild cure finishing process, by which the polymer chains of the cellulose fibers are crosslinked through reaction with the methylol amide finishing agent, is conducted by heating the wet, impregnated fabric (without predrying) at a temperature of from about 60°C to about 105°C (about 140°F to about 221°F). This heat treatment is carried out in an oven, chamber, tenter frame, or other equipment with means of circulating and exhausting the heated air under conditions adjusted so that in curing the moisture content of the treated fabric is reduced to about 2% to 5%. The exact conditions required vary with equipment used and the material being treated. With lightweight goods, for example fabric weighing about 5 oz. per sq. yard or less, heating for a period of from about one to about 8 minutes at a temperature of from about 60°C to about 105°C produces the desired results. Some care must be exercised in properly controlling the curing conditions. If the moisture content of the treated fabric is much higher than about 5%, the treatment fails to develop a suitable level of dry (conditioned) wrinkle resistance although some reaction may occur between the cellulose and the finishing agent. If the moisture content of the treated fabric is reduced to much below about 2% in the curing operation, an excessive amount of fabric strength is lost and the finished fabric does not exhibit some of the desirable characteristics of the mild cure finish (e.g. higher moisture regain and wet wrinkle resistance than are usual from conventionally finished, crosslinked cotton fabrics).

The following examples describe the invention in further detail. All percentages given are by weight. Recognized test procedures and methods of analysis have been used for determination of properties of the fabrics and for control of treatment conditions.

EXAMPLE 1

Samples of cotton printcloth were impregnated to wet pickups of about 90% with an aqueous solution, 100 g. of which contained 13.5 g. of dimethylol dihydroxyethyleneurea with 10 millimoles of a salt catalyst selected from the group consisting of $(NH_4)_2SO_4$, NH₄Cl, and NH₄NO₃. These salt catalysts represent the ammonium salt of sulfuric acid, hydrochloric acid, and nitric acid, respectively. These inorganic acids have been shown to be very effective mild cure catalysts (Textile Chemists and Colorists 1, page 415 ff and Table I of this reference).

The wet, impregnated fabrics were pinned on frames and treated by the mild cure finishing process by heating in a forced air-circulation oven, for the times indicated in the following table, which reduced the moisture content of the treated fabrics to about 2–5%. The treated samples were analyzed and evaluated after laundering. Durable press ratings of the samples were determined after washing and tumble drying by the Procedure of the American Association of Textile Chemists and Colorists, AATCC Test Method 124–1969 (AATCC Technical Manual, Volume 46, pages 177–178, 1970) and nitrogen contents by the Kjeldahl method.

| Cure conditions | | (NH₄)₂SO₄ | | NH₄Cl | | NH₄NO₃ | |
|---|---|---|---|---|---|---|---|
| minutes | °C | DP¹ | %N | DP | %N | DP | %N |
| 7 | 60 | 1.4 | 0.04 | 1.4 | 0.02 | 1.4 | 0.03 |
| 2.5 | 90 | 1.4 | 0.07 | 1.3 | 0.05 | 1.4 | 0.06 |
| 1.5 | 95 | 1.2 | 0.08 | 1.3 | 0.04 | 1.3 | 0.06 |
| 2.5 | 100 | 1.3 | 0.19 | 1.3 | 0.11 | 1.3 | 0.14 |
| 1.5 | 105 | 1.4 | 0.14 | 1.5 | 0.09 | 1.2 | 0.08 |
| Blank | — | 1.3 | — | | | | |

¹DP = durable press rating after tumble drying.

It is obvious from the table that the ammonium salts of the strong inorganic acids (sulfuric, hydrochloric and nitric acids) are unsuitable catalysts for the mild cure finishing process.

EXAMPLE 2

Samples of cotton printcloth were impregnated to wet pickups of about 85% with an aqueous solution, 100 g. of which contained 13.5 g. dimethylol dihydroxyethyleneurea with 2 millimoles, 3 millimoles, or 4 millimoles of p-toluenesulfonic acid (PTSA) as catalyst.

The wet, impregnated fabrics were cured by the procedure of Example 1 and evaluated with results shown in the following table. p-Toluenesulfonic acid is an effective mild cure catalyst at concentrations of 3 millimoles or greater per 100 g.

| Cure conditions | | Millimoles catalyst per 100 g. treatment solution: | | | | | |
|---|---|---|---|---|---|---|---|
| minutes | °C | 2 | | 3 | | 4 | |
| | | DP | %N | DP | %N | DP | %N |
| 7 | 60 | 1.3 | 0.09 | 3.4 | 1.21 | 4.0 | 1.25 |
| 2.5 | 90 | 1.4 | 0.10 | 3.6 | 1.22 | 4.3 | 1.24 |
| 1.5 | 95 | 1.2 | 0.07 | 3.6 | 1.08 | 4.0 | 1.12 |
| 2.5 | 100 | 1.4 | 0.11 | 4.2 | 1.28 | 4.6 | 1.24 |
| 1.5 | 105 | 1.3 | 0.07 | 4.0 | 1.22 | 4.5 | 1.30 | treatment solution. This demonstrates that this organic acid is similar in catalytic activity to that of the inorganic acids operative for mild cure finishing.

EXAMPLE 3

To 19 g. (100 millimoles) of the monohydrate of p-toluenesulfonic acid was added a small amount of water to partially dissolve the acid, 5.7 g. (100 millimoles) of 29.8% NH₃ was very slowly added, then the solution was brought to 100 ml. volume. This stock solution contained 1 millimole of ammonium p-toluenesulfonate per milliliter of solution.

Samples of cotton printcloth were impregnated to wet pickups of about 90% with an aqueous solution, 100 g. of which contained 13.5 g. dimethylol dihydroxyethyleneurea with 5 millimoles, 7.5 millimoles, or 10 millimoles of ammonium p-toluenesulfonate as catalyst.

The wet, impregnated fabrics were cured by the procedure of Example 1, tested for breaking strength on 1-inch strips by ASTM Method D1682-64 and then evaluated. Results are shown in the table.

| Cure conditions | | Millimoles catalyst per 100 g. treatment solution: | | | | | | | | |
|---|---|---|---|---|---|---|---|---|---|---|
| minutes | °C | 5 | | | 7.5 | | | 10 | | |
| | | DP | Brk str. warp, lbs. | %N | DP | Brk Str., warp, lbs. | %N | DP | Brk Str. warp, lbs. | %N |
| 7 | 60 | 1.0 | — | 0.08 | 1.4 | 43 | 0.30 | 3.3 | 30 | 1.18 |
| 2.5 | 90 | 1.2 | — | 0.10 | 1.4 | 45 | 0.30 | 4.0 | 27 | 1.27 |
| 1.5 | 95 | 1.2 | — | 0.08 | 1.4 | 44 | 0.32 | 3.7 | 27 | 1.27 |
| 2.5 | 100 | 1.3 | — | 0.24 | 3.3 | 32 | 1.08 | 4.5 | 25 | 1.33 |
| 1.5 | 105 | 1.2 | — | 0.18 | 3.3 | 30 | 1.17 | 4.5 | 26.5 | 1.33 |
| Blank | — | 1.0 | 50 | — | — | — | — | — | — | — |

Much to our surprise, the ammonium p-toulenesulfonate is an effective mild cure catalyst. This is particularly unexpected as the ammonium salts of the inorganic acids H₂SO₄, HCl, and HNO₃ were not effective as demonstrated in Example 1.

To achieve improvement in smooth drying appearance required in durable press fabric, as a minimum, 7.5 millimoles per 100 g. of treatment solution of the ammonium p-toluenesulfonate is needed with curing conditions of 2.5 minutes at 100°C. With the increased concentration of 10 millimoles per 100 g. treatment solution, improved smoothness can be achieved at 60°C for 7 minutes.

The strength retention of the treated fabrics was about equivalent to that achieved in the pad-dry-cure processes employed to obtain durable press fabrics.

The nitrogen values reflect the extent of reaction of the crosslinking agent with the cellulosic fabric and demonstrate, further, and to our surprise, that this salt is an effective catalyst whereas the ammonium salts of the common inorganic acids shown in Example 1 are not.

EXAMPLE 4

The following salts were prepared in stock solutions for subsequent mild cure applications:

Diammonium salt of sulfoacetic acid [$(NH_4)_2(SAA)$]. To 7.9 g. (50 millimoles) of the monohydrate of sulfoacetic acid was added a small amount of water, then 5.7 g. (100 millimoles) of 29.8% $NH_3$ was slowly added and the solution was brought to 100 ml. volume with water. Each milliliter contained 0.5 millimole of diammonium carboxymethanesulfonate.

Ammonium salt of sulfoacetic acid [$(NH_4)(SAA)$]. To 7.9 g. (50 millimoles) of the monohydrate of sulfoacetic acid in 40 milliliters of water was added 2.85 g. (50 millimoles) of 29.8% $NH_3$. The solution was brought to 100 ml. volume and each ml. contained 0.5 millimoles of ammonium carboxymethanesulfonate.

Ammonium salt of p-toluenesulfonic acid [$(NH_4)(PTSA)$]. The salt, ammonium p-toluenesulfonate, was prepared following the procedure of Example 3.

Ammonium salt of benzenesulfonic acid [$(NH_4)(BSA)$]. To 8.8 g. (50 millimoles) of the monohydrate of benzenesulfonic acid in about 40 ml. of water was added 2.85 g. (50 millimoles) of 29.8% $NH_3$. The solution was brought to 100 ml. volume and each milliliter contained 0.5 millimole of ammonium benzenesulfonate.

Ammonium salt of methanesulfonic acid [$(NH_4)(MSA)$]. To 4.8 g. (50 millimoles) of methanesulfonic acid in about 40 ml. water was added 2.85 g. (50 millimoles) of 29.8% $NH_3$. The solution, after diluting to 100 ml. volume, contained 0.5 millimole of ammonium methanesulfonate per milliliter.

Ammonium salt of hydroxymethanesulfonic acid [$(NH_4)(HMSA)$]. To 44.1 g. (50 millimoles) of 12.7% hydroxymethanesulfonic acid was added 2.85 g. (50 millimoles) of 29.8% $NH_3$. The solution, after diluting to 100 ml. volume, contained 0.5 millimole of ammonium hydroxymethanesulfonate per milliliter.

Samples of cotton printcloth were impregnated to wet pickups of about 95% with an aqueous solution, 100 g. of which contained 13.5 g. of dimethylol dihydroxyethyleneurea with 10 millimoles of the ammonium salt catalyst.

The wet, impregnated fabrics were cured by the procedure of Example 1 for 2.5 minutes at 100°C. Visual observations were made of the whiteness of the fabric before and after treatments. Results of smooth appearance for durable press and color change are tabulated in the following table:

| Catalyst | DP rate after: | | Fabric color change |
|---|---|---|---|
| | Line drying | Tumble drying | |
| $(NH_4)_2(SAA)$ | 1.5 | 1.5 | None |
| $(NH_4)(SAA)$ | 3.5 | 4.2 | None |
| $(NH_4)(PTSA)$ | 3.3 | 3.3 | None |
| $(NH_4)(BSA)$ | 3.5 | 4.4 | None |
| $(NH_4)(MSA)$ | 3.5 | 4.0 | None |
| $(NH_4)(HMSA)$ | 1.7 | 1.5 | None |
| Untreated | 1.4 | 1.3 | — |

The applicability of the use of ammonium salts is limited in this invention to rather specific sulfonic acid derivatives as illustrated in the results in the above table. Ammonium carboxymethanesulfonate, the monoammonium salt of sulfoacetic acid, $(NH_4)(SAA)$, is a suitable mild cure catalyst whereas the diammonium salt, $(NH_4)_2(SAA)$, of this same acid is not effective. The hydroxymethanesulfonic acid salt is not effective despite its similarity to ammonium methanesulfonate which does provide satisfactory catalysis. Both alkyl ammonium sulfonates, $(NH_4)(SAA)$ and $(NH_4)(MSA)$, and aromatic ammonium sulfonates, $(NH_4)(PTSA)$ and $(NH_4)(BSA)$, are suitable.

It is of particular significance to note, in all instances, the white cotton printcloth had no discoloration after treatment under the mild cure conditions employed whereas discoloration is a common occurrence with ammonium salts used under more stringent curing conditions.

EXAMPLE 5

Samples of a cotton printcloth, a 50/50 polyester/cotton semi-printcloth, and a 35/65 polyester/cotton sheeting were impregnated to wet pickups of about 90% with an aqueous solution, 100 g. of which contained 9 g. dimethylol dihydroxythyleneurea and 10 millimoles of ammonium methanesulfonate, the ammonium salt of methanesulfonic acid, $(NH_4)(MSA)$, prepared as in Example 4.

The wet, impregnated fabrics were cured by the procedure of Example 1 for 2.5 minutes at 100°C and evaluated for smooth appearance after line and tumble drying shown in the following table:

| Fabric | DP rating after: | | | |
|---|---|---|---|---|
| | Line drying | | Tumble drying | |
| | Untreated | Treated | Untreated | Treated |
| Cotton printcloth | 1.0 | 3.9 | 1.0 | 3.7 |
| 50/50 semi-printcloth | 2.4 | 3.3 | 2.6 | 4.7 |
| 35/65 sheeting | 1.6 | 3.4 | 2.0 | 4.5 |

The improvement in smooth drying performance by use of ammonium methanesulfonate with dimethylol dihydroxyethyleneurea in comparison with the untreated controls of each fabric is evident. This demonstrates the effectiveness of the ammonium salt catalysts of this invention in mild cure treatment of fabrics containing 50% or more cellulosic material.

EXAMPLE 6

100 g. of treatment solutions were prepared to contain 15 g. of finishing agent and 10 millimoles of catalyst.

Solution A contained as the finishing agent, dimethylol methyl carbamate (DMMC) and ammonium methanesulfonate catalyst, $(NH_4)(MSA)$, as prepared in Example 4.

Solution B contained as the finishing agent, a monomeric methylated urea formaldehyde (MeUF) and ammonium methanesulfonate catalyst, $(NH_4)(MSA)$, as prepared in Example 4.

Solution C contained as the finishing agent, dimethylol methyl carbamate and ammonium benzenesulfonate catalyst, $(NH_4)(BSA)$, as prepared in Example 4.

Solution D contained as the finishing agent, a monomeric methylated urea formaldehyde and ammonium benzenesulfonate catalyst, $(NH_4)(BSA)$ as prepared in Example 4.

Samples of cotton printcloth were impregnated to wet pickups of about 90% with the above solutions.

The wet, impregnated fabrics were cured by the procedure of Example 1 for 2.5 minutes at 100°C and evaluated for smooth appearance after line and tumble drying as shown in the table below:

| Catalyst | Agent | DP rating after: | |
|---|---|---|---|
| | | Line drying | Tumble drying |
| (NH$_4$)(MSA) | DMMC | 4.3 | 4.2 |
| (NH$_4$)(MSA) | MeUF | 3.7 | 3.6 |
| (NH$_4$)(BSA) | DMMC | 4.2 | 4.0 |
| (NH$_4$)(BSA) | MeUF | 3.6 | 3.9 |

The ammonium salts of the alkyl sulfonic acid, methanesulfonic acid, and of the aromatic sulfonic acid, benzenesulfonic acid, are good catalysts for mild cure finishing with carbamate finishing agents and urea formaldehyde fnishing agents.

EXAMPLE 7

100 g. of treatment solutions were prepared to contain 6, 9, 12, 15 and 18 g. of the finishing agent dimethylol dihydroxyethyleneurea. The amount of the catalyst employed, ammonium methanesulfonate, was such that ratios of 0.50, 0.67, and 1.00 of catalyst to finishing agent were used according to the following formula:

$$\frac{\text{millimoles catalyst}}{\text{g. finishing agent}} \text{ in 100 g. treatment solution.}$$

Each ratio was used with each concentration of finishing agent.

Samples of cotton printcloth were impregnated to wet pickups of about 90% with the above solutions.

The wet, impregnated fabrics were cured by the procedure of Example 1 for 2.5 minutes at 100°C and evaluated for smooth appearance after tumble drying. Results are given in the following table:

| Finishing agent concentration, % | Durable press ratings with the following catalyst to finishing agent ratios[1] | | |
|---|---|---|---|
| | 0.50 | 0.67 | 1.00 |
| 6 | 1.4 | 1.3 | 3.4 |
| 9 | 1.4 | 1.7 | 3.5 |
| 12 | 1.3 | 3.3 | 4.2 |
| 15 | 1.4 | 3.7 | 4.5 |
| 18 | 1.5 | 4.5 | 4.5 |

[1]In 100 g. treatment solution, the ratio of millimoles of catalyst per g. of finishing agent.

The above results demonstrate a wide range of catalyst and finishing agent concentrations. Durable press ratings of 3 (considered satisfactory by those skilled in the art) are achieved at finishing agent concentrations as low as 6% with a catalyst to finishing agent ratio of 0.67 or higher.

We claim:
1. In a mild cure finishing process for producing durable press textile fabrics that are composed of at least 50% of a cellulosic fiber whereby the textiles are impregnated with an aqueous solution containing an N-methylolamide crosslinking agent and a strongly acidic catalyst, curing said textile, without pre-drying, at a temperature of about 60°C to 105°C to reduce moisture content of the finished textile to about 2 to 5%, the improvement characterized by using as catalyst an ammonium sulfonate salt selected from the group consisting of: ammonium methanesulfonate; ammonium carboxymethanesulfonate (NH$_4$O$_3$SCH$_2$COOH), ammonium benzenesulfonate, and ammonium p-toluenesulfonate.

2. The improvement as characterized in claim 1 wherein the catalyst is ammonium methanesulfonate.

3. The improvement as characterized in claim 1 wherein the catalyst is ammonium carboxymethanesulfonate.

4. The improvement as characterized in claim 1 wherein the catalyst is ammonium benzenesulfonate.

5. The improvement as characterized by claim 1 wherein the catalyst is ammonium p-toluenesulfonate.

* * * * *